United States Patent [19]

Westermeyer

[11] Patent Number: 5,404,730
[45] Date of Patent: Apr. 11, 1995

[54] HELICAL OIL SEPARATOR

[75] Inventor: Gary W. Westermeyer, Bluffs, Ill.

[73] Assignee: AC&R Components, Inc., Chatham, Ill.

[21] Appl. No.: 100,169

[22] Filed: Aug. 2, 1993

Related U.S. Application Data

[63] Continuation-in-part of Ser. No. 932,668, Aug. 20, 1992, Pat. No. 5,271,245.

[51] Int. Cl.6 .............................................. F25B 43/02
[52] U.S. Cl. ......................................... 62/470; 62/84; 62/503
[58] Field of Search .................... 62/84, 468, 470, 503

[56] References Cited

U.S. PATENT DOCUMENTS

| | | |
|---|---|---|
| 2,446,882 | 8/1948 | Morrison . |
| 2,511,967 | 6/1950 | Campbell . |
| 2,665,557 | 1/1954 | Dodson . |
| 3,012,414 | 12/1961 | La Porte ................. 62/503 |
| 3,070,977 | 1/1963 | Kimmel et al. . |
| 3,283,532 | 11/1966 | Kocher . |
| 3,324,680 | 6/1967 | Cremer . |
| 3,438,218 | 4/1969 | O Neil .................... 62/503 |
| 3,778,984 | 12/1973 | Lawser . |
| 4,263,029 | 4/1981 | George . |
| 4,282,717 | 8/1981 | Bonar, II . |
| 4,478,050 | 10/1984 | DiCarlo et al. . |
| 4,506,523 | 3/1985 | DiCarlo et al. . |
| 4,690,759 | 9/1987 | Mandy . |
| 4,938,036 | 7/1990 | Hodgkins ................. 62/503 |
| 5,113,671 | 5/1992 | Westermeyer . |

FOREIGN PATENT DOCUMENTS

| | | |
|---|---|---|
| 0140402 | 5/1985 | European Pat. Off. . |
| 0346301 | 12/1989 | European Pat. Off. . |
| 1028269 | 11/1950 | France . |
| 3705850 | 9/1988 | Germany . |
| 294771 | 10/1991 | Germany . |
| 2982762 | 9/1980 | U.S.S.R. . |

Primary Examiner—Ronald C. Capossel
Attorney, Agent, or Firm—Hill, Steadman & Simpson

[57] ABSTRACT

An improved oil/gas separator having an upright cylindrical housing with a radial oil/gas inlet and a gas outlet pipe arranged within the housing downward and terminating within the housing with an open end. A helical wall is mounted coaxially around the gas outlet pipe and an oil collection zone is arranged below the open end of the gas outlet pipe. A drip ring is mounted at a low end portion of the gas outlet pipe adjacent to the open end to prevent oil from being entrained into the gas proceeding into the open end. A replaceable porous filter can be provided above an exit end of the gas outlet pipe for a last stage of oil removal from the gas flowing through the separator. A baffle is arranged below the porous filter and above the helical wall for collecting oil removed by the porous filter.

27 Claims, 4 Drawing Sheets

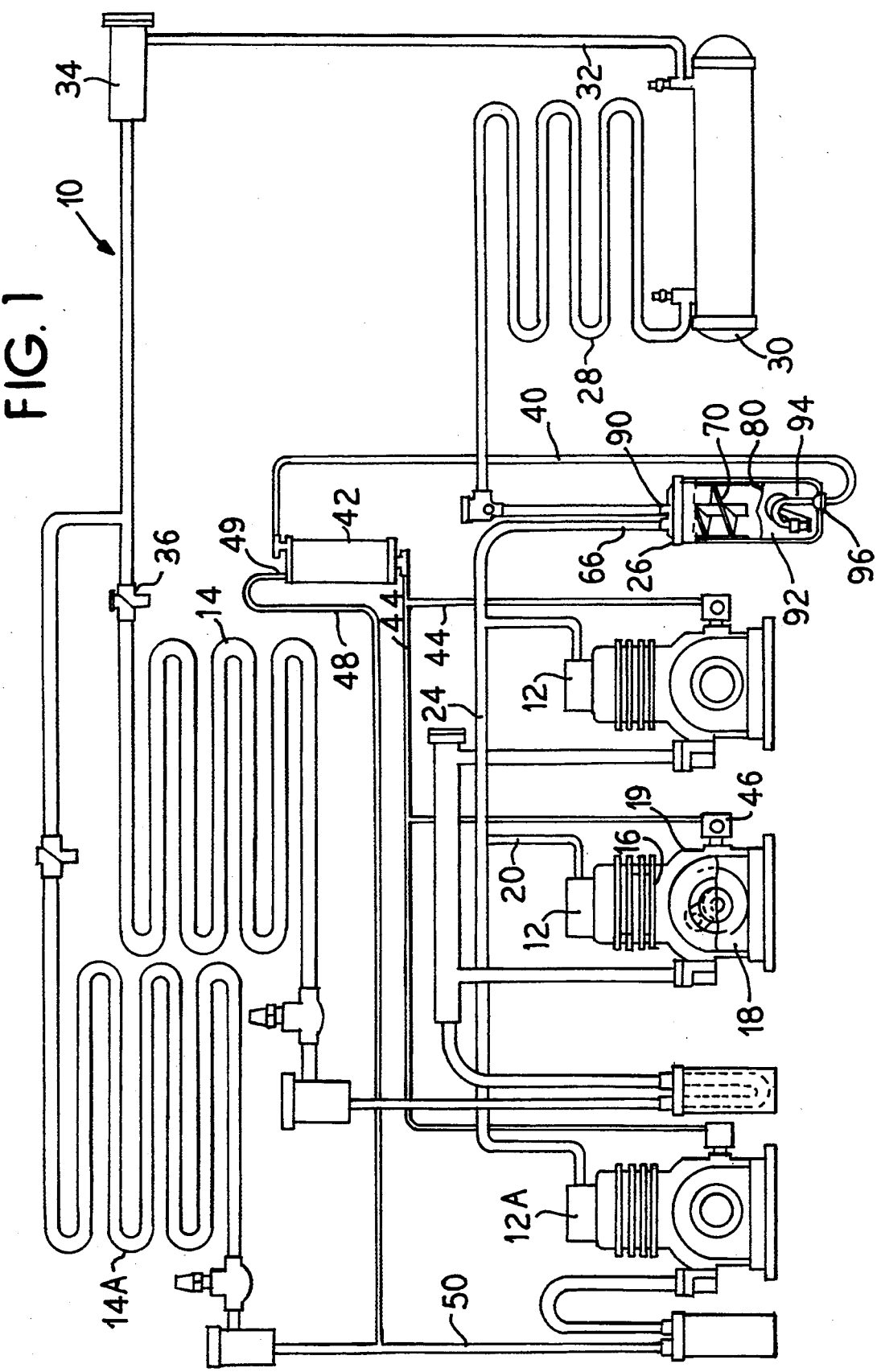

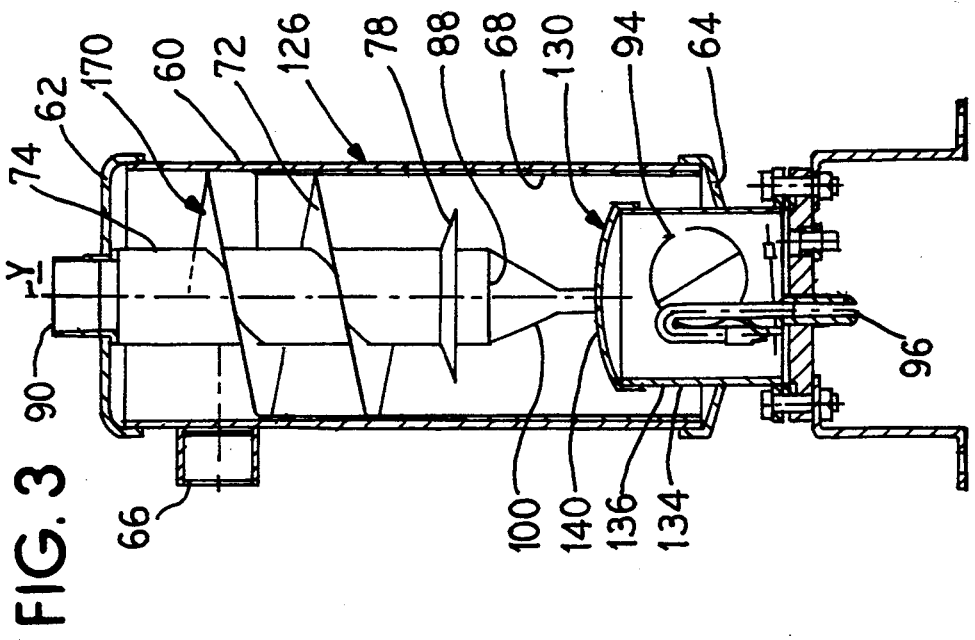
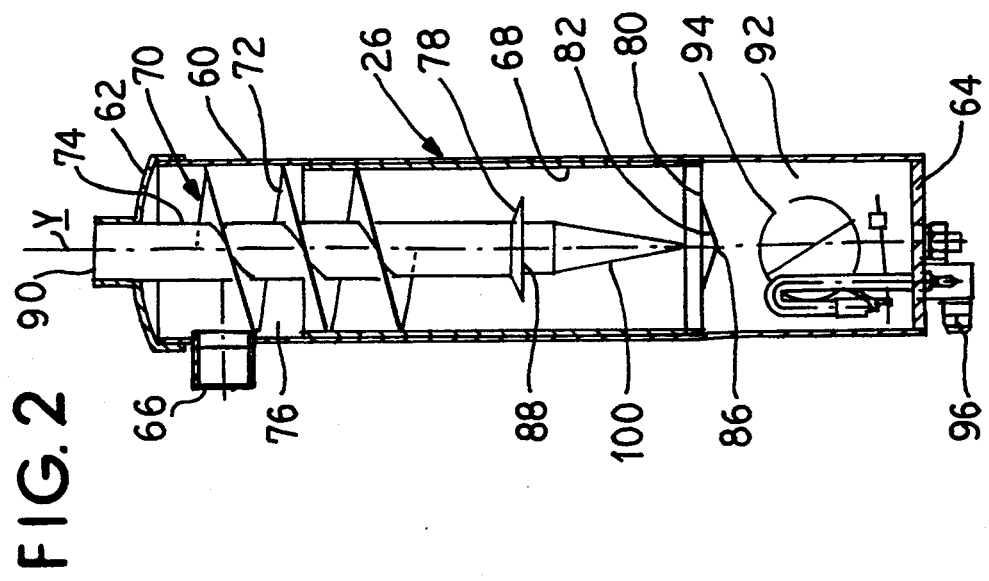

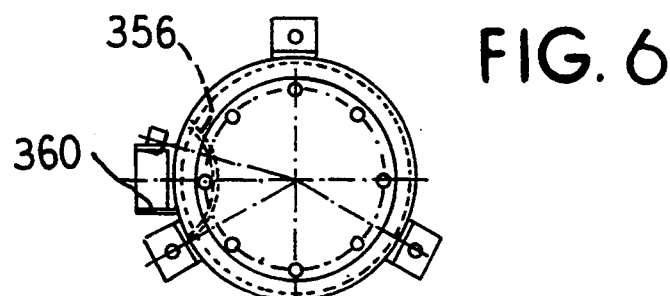
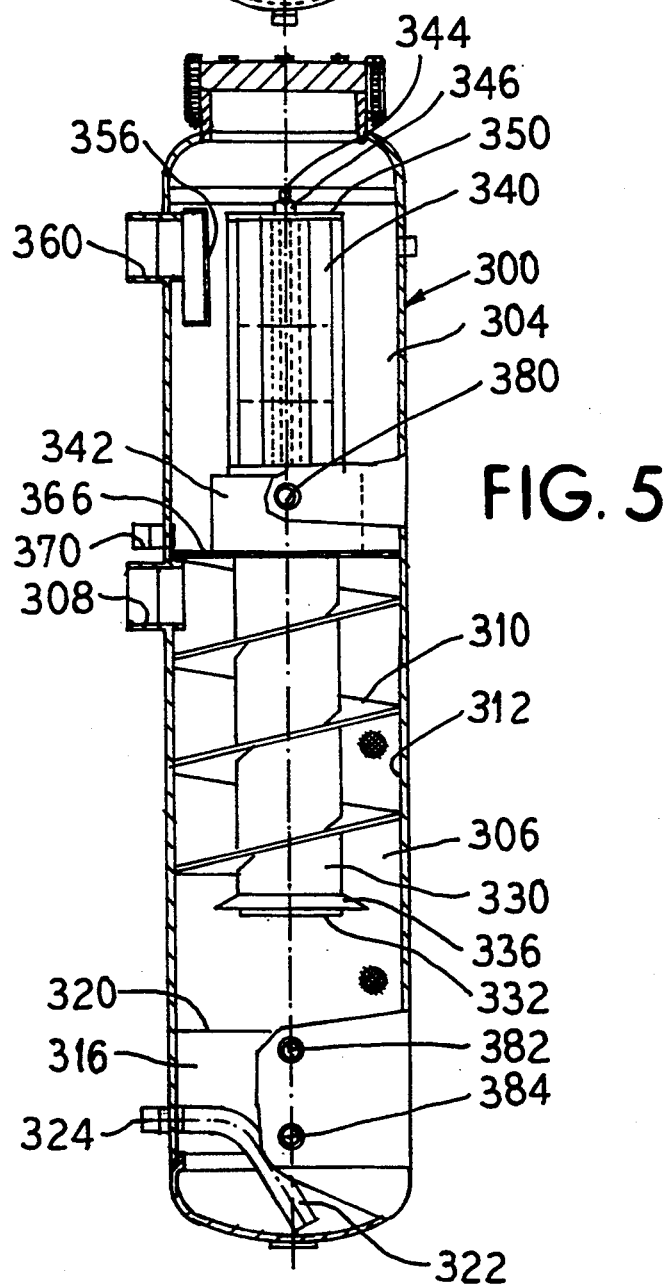

HELICAL OIL SEPARATOR

BACKGROUND OF THE INVENTION

This application is a continuation-in-part of U.S. Ser. No. 07/932,668, filed Aug. 20, 1992, now U.S. Pat. No. 5,271,245.

The present invention relates to oil separators and more particularly to an oil separator for use in a refrigeration system to separate oil from an oil/refrigerant gas mixture.

Refrigeration systems utilize a compressor to compress a refrigerant gas, a condenser to cool the compressed gas and to cause the gas to condense to a liquid, and an evaporator for absorbing heat from the area to be refrigerated as the liquid refrigerant expands and evaporates. In many such systems, oil is used as a lubricant and to provide a more effective seal in the compressor and, by such use, is mixed with the refrigerant gas in the compressor and is carried along with the refrigerant. Oil, however, is not a refrigerant and therefore it reduces the efficiency of the system if the oil is permitted to remain mixed with the refrigerant gas as it moves to the condenser. Therefore, it is known to provide an oil separator in the line between the compressor and condenser to remove the oil from the refrigerant gas. Generally, refrigerant gas from the compressor contains oil in the form of a fog as it enters the oil separator inlet.

Various arrangements have been provided for separating the oil from the gas. For example, U.S. Pat. No. 5,113,671 discloses a device for separating oil from a gas. The device includes a housing having a peripheral wall, an inner mesh screen, an inlet for receiving an oil/gas mixture, a gas outlet, and an oil outlet. Within the housing there is a helical wall extending between the gas outlet and the peripheral wall to cause the oil/gas mixture to flow in a largely circumferential path along the peripheral wall. A drip ring is provided at a bottom position with respect to the helical wall. The collected oil drips from the screen to a baffle with apertures therethrough which directs the oil to an oil collection zone below the baffle. The oil collection zone provides a float valve to maintain an oil level above the oil outlet. The gas outlet conduit has an opening above the baffle for permitting relatively oil-free gas to exit the oil separator.

U.S. Pat. No. 3,778,984 discloses an arrangement for introducing the oil and gas mixture tangentially to a separator so as to centrifuge the oil from the gas so that the oil will fall downwardly under the force of gravity into a collecting chamber in the bottom of the separator.

U.S. Pat. No. 4,478,050 discloses an oil separator in which fluid is introduced tangentially in a chamber bounded by a screen upon which the oil particles collect. The oil and refrigerant mixture is caused to flow in a vortex providing centrifugal separation of oil particles. Deflector tabs are provided to enhance or regenerate the vortex in the lower portion of the chamber above the oil outlet opening.

U.S. Pat. No. 4,263,029 discloses an oil separator in which fluid is introduced tangentially in a passageway formed by spiral wall having a single revolution. The fluid then passes to a chamber bounded by an annular ring and then to a chamber bounded by a funnel shaped wall with a central opening for passage therethrough of collected oil and including vanes for guiding the oil to the opening. The "oil fee" gas leaves the separator through a central, axial passage.

SUMMARY OF THE INVENTION

The present invention provides an improved oil separator which provides an enhanced oil separation capability without increasing the size of the oil separator. The oil/refrigerant mixture is caused to flow in a generally spiral flow path along the peripheral wall of the oil separator chamber so as to increase the effective path length of the oil/refrigerant mixture along the peripheral wall. A screen mesh is provided along the wall to enhance the separation of oil from the mixture and to provide a collection area for the separated oil.

The separated oil drips from the screen to an inverted funnel/baffle which has a drain hole therethrough to allow the separated oil to drop into an oil collection chamber. A float valve arrangement is provided in the oil collection chamber which permits periodic dispensing of the oil from the chamber to an oil reservoir.

The refrigerant gas which is largely free of oil passes through a central passage or conduit to proceed to the condenser.

A preferred method for providing the enhanced effective length of the peripheral wall is to put a stationary helical wall or auger in the annular space between the peripheral wall and the center conduit for leading the refrigerant gas from the separator. The oil/refrigerant mixture is introduced to the oil separator at a top end of the device and is caused to impinge upon the flights of the helical wall and to follow the helical path as the mixture moves downwardly.

As a further improvement, a drip ring, such as a disk, is mounted on a bottom side of the helical wall which directs collected oil from the auger flights radially outwardly and prevents oil from being entrained back in the gas flow at the inlet to the central passage. Additionally, the drip ring helps form an oil-free gas vortex at the inlet to the central passage which, by centrifugal action, hurls more oil against the screen.

As a further improvement of the invention and particularly effective for low flow rates, a conical mesh screen is applied at the inlet to the central passage. This mesh screen provides a final stage of removing oil entrained in the gas stream before it proceeds into the central passage. Oil collected by this conical screen will eventually drip down into the oil collection area.

As a still further embodiment of the invention, an oil separator is provided which has upper and lower compartments, separated by a baffle plate. The lower compartment has a downwardly extending gas flow pipe with a helical auger baffle surrounding the gas flow pipe with an oil drip ring surrounding the gas flow pipe adjacent its open end. A top end of the gas flow pipe communicates into the upper compartment and particularly communicates into a cylindrically shaped, porous replaceable coalescing filter.

Gas flow in this embodiment is initially introduced into the lower compartment where it moves around the helical auger with a portion of the entrained oil removed by centrifugal action and by a mesh screen arranged around an inside diameter of the lower compartment. Oil passes down through a baffle and into an oil collection zone. An oil outlet is provided in the oil collection zone. A second oil outlet is provided above the baffle plate separating the upper and lower compartments for removing oil from the separator, oil separated by the coalescing filter. The gas outlet is provided in an upper portion of the upper compartment.

This embodiment of the separator provides a compact easily serviced dual stage separator which provides that the coalescing filter is adjacent a top openable end of the separator for removal and replacement.

BRIEF DESCRIPTION OF THE DRAWINGS

FIG. 1 illustrates a refrigeration system incorporating an oil separator embodying the principles of the present invention.

FIG. 2 is a sectional view of an oil separator embodying the principles of the present invention.

FIG. 3 is a sectional view of an alternate embodiment oil separator embodying the principles of the present invention.

FIG. 5 is a partial sectional view of a further alternate embodiment oil separator embodying the principles of the present invention.

FIG. 6 is a top plan view of the separator of FIG. 5.

DESCRIPTION OF THE PREFERRED EMBODIMENTS

Figure 4:
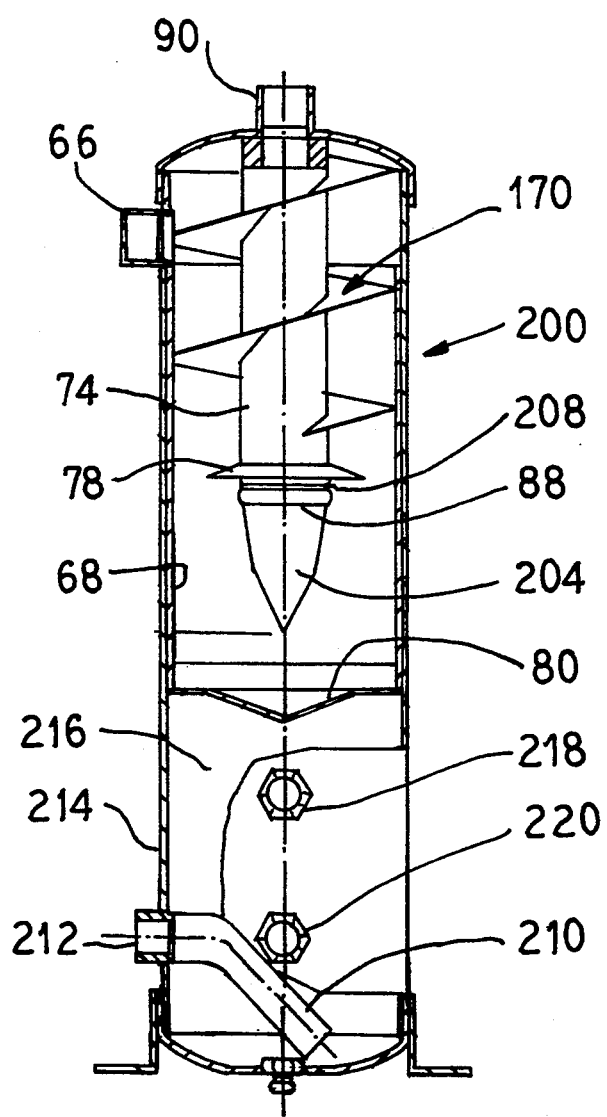
FIG. 4 is a partial sectional view of a further alternate embodiment oil separator embodying the principles of the present invention.

FIG. 1 illustrates a standard refrigerant system 10. In such a system one or more compressors 12 are used to compress a refrigerant gas after that gas has expanded in an evaporator 14. The compressors 12 utilize a reciprocating piston 16. Oil 18 is provided in an abundant supply within a crankcase 19 of the compressor 12 both to provide lubrication to the piston 16 as well as to enhance the sealing of the piston within the compressor so as to increase the efficiency of the compressor. During operation of the compressor, the oil becomes atomized and mixed with the refrigerant as the mixture leaves through an exit conduit 20. The mixture passes into a manifold 24 which communicates with additional compressors 12 if there are multiple compressors arranged in a parallel arrangement.

Since the oil is not a refrigerant and the presence of oil in the refrigerant decreases the efficiency of the remainder of the refrigeration system, an oil separator 26 is provided in the line between the compressor 12 and a condenser 28 so as to remove the oil from the gas mixture. An improved oil separator embodying the principles of the present invention is described in greater detail below.

As the gas moves into the condenser 28 it is cooled and is caused to condense into a liquid which is captured in a receiver 30. The cooled refrigerant liquid then flows through a conduit 32, through a filter-dryer 34, and through an expansion valve 36 to the evaporator 14. In the evaporator the liquid refrigerant is caused to evaporate thereby absorbing heat energy and thus cooling an area associated with the evaporator. The refrigerant gas then flows through conduit 38 to return to the compressors 12. More than one evaporator 14, 14A may be provided, and if so, one or more satellite compressors 12A are provided to receive and compress the refrigerant gas from the extra evaporators 14A to feed the compressed gas/oil mixture to the manifold 24 for passage through the oil separator 26.

The oil which has been separated in the oil separator 26 is directed through a conduit 40 to an oil reservoir 42 from which it is supplied through conduits 44 to the compressors 12. Oil level regulators 46 associated with each compressor allow for the introduction of the proper amount of oil to the compressors. The oil reservoir 42 is provided with a vent line 48 having a valve 49 therein which reduces the pressure within the oil reservoir to a level just slightly in excess of that present in a gas inlet line 50 so as to provide a slight positive pressure to ensure an adequate oil supply from the oil reservoir 42 to the oil level regulators 46.

The oil level regulators 46 control the oil level in each crankcase 19 by means of a float operated valve. The oil level regulator 46 holds back excess oil until the oil level in the compressor crankcase 19 drops, lowering the float and opening the valve. Oil from the oil reservoir 42 will then be admitted into the crankcase raising the float. When the correct level is reached, the valve will close, stopping the flow of oil to that particular crankcase. The oil level regulators may also be adjustable to provide slightly varying oil levels within the crankcase as disclosed in U.S. Pat. No. 4,428,208, assigned to the assignee of the present invention and incorporated herein by reference.

An improved oil separator 26 embodying the principles of the present invention is shown in greater details in FIG. 2. The oil separator has a generally cylindrical vertical axis X, outer housing or peripheral wall 60 which is closed by a top end cap 62, and a bottom end cap 64. The top end cap 62 includes an inlet 66 extending radially to an axis of the housing for connection to the manifold 24 from the compressors 12. The oil enters the oil separator inlet 66 in the form of a fog carried along with the refrigerant gas. Lining an inside surface of the oil separator housing 60 is a means for collecting and separating oil from the oil/gas mixture, preferably in the form of a mesh screen 68 which can be a 20 mesh steel wire cloth made with 0.016" wire diameter, or can be a 40 mesh screen. The screen 68 extends around the entire periphery of the housing 60 and extends along a portion of the height of the housing from the top end cap 62 towards the bottom.

Interior of the housing is a static auger 70 which has a helical thread wall or flights 72 formed thereon and extending outwardly from a central hollow cylindrical conduit 74 toward the peripheral wall 60. The wall 72 of the auger 70 is sized to be closely adjacent to or in contact with the steel mesh liner, but spaced from the peripheral wall 60, such that a helical flow path 76 results between the inlet 66 and a lower portion of the collector. The helical wall 72 preferably makes at least two full revolutions. Thus, the oil/refrigerant mixture will be forced to follow a largely circumferential flow path along the mesh screen 68 providing a substantially longer effective length of the steel mesh screen seen by the oil/refrigerant mixture than if the oil/refrigerant mixture were allowed to flow axially along the peripheral wall 60. Of course, a largely circumferential flow path, other than a helical flow path can be provided by appropriately arranged walls between said peripheral wall 60 and said conduit 74.

The auger 70 further provides a baffle such as a drip ring 78 mounted at approximately a bottom end of the conduit 74. The function of this baffle will be described below.

Both the mesh screen 68 and the auger 70 terminate well above the bottom end cap 64. Spaced below the mesh screen 68 and the auger 70 is a funnel/baffle 80 which has a central conical wall 82 sloping downwardly and inwardly. An aperture 86 is provided through the baffle 80 which act as a drain hole for the oil which has collected on the mesh screen 68 and which has dripped from the screen. The refrigerant, which is now relatively free of oil, exits the oil separator 26 through the interior of the conduit 74 through a bottom opening 88 thereof which is spaced above the baffle 80 and leaves the oil separator 26 at an outlet 90 which leads to the condenser 28.

The oil which has separated from the refrigerant and which has drained through the aperture 86 collects in a collection area or chamber 92 in the bottom of the oil separator. Preferably a float valve 94 is provided to periodically dispense collected oil from the collection zone through an oil return fitting 96 to the conduit 40 leading to the oil reservoir 42.

There are at least two advantages provided by the drip ring 78. First, oil flowing on an outside of the conduit 74 downwardly will not easily be entrained by the gas entering the bottom opening 88 of the conduit and hence exiting with the oil free gas. Oil progressing downward off the helical wall 72 will be forced radially outward by the ring 78, away from the bottom opening 88 of the conduit. Second, a gas vortex 100 forms between the ring 78 and the wall 82 and any oil dripping from the ring will be thrown by the radial velocity of the gas vortex toward and onto the mesh screen 68.

FIG. 3 illustrates an alternate configuration for an oil separator 126. In this figure like parts to the separator 26 are referred to by the same number. In this configuration, the baffle 80 has been replaced by a sump 130 having a plurality of holes 134 in a cylindrical side wall 136. Oil draining from the screen will fill a bottom of the separator above the bottom cap 64 and proceed through the holes 134 into the sump 130 and thereafter pass through the float valve 94 and out of the fitting 96. Similar to FIG. 2, a gas vortex 100 forms between the opening 88 and a cover 140 of the sump 130. In the configuration of FIG. 3, the auger 170 provides for one less turn than that shown in FIG. 2, the auger design is dictated by sizing and process conditions.

The baffle or drip ring 78 of the present invention can be utilized with the auger type separator as described in U.S. Pat. No. 5,113,671 which is herein incorporated by reference.

FIG. 4 illustrates a further alternate embodiment of the separator of the invention. A separator 200 provides the auger 170 arranged around the conduit 74 having the bottom opening 88 for eliminating gas from the separator 200. The separator 200 also provides the drip ring 78 at a bottom end of the conduit 74. In this embodiment, a conical screen 204 is attached to the conduit 74 at the opening 88. Gas which proceeds into the opening 88 must pass through the conical screen 204. This conical screen provides a last stage oil separation from the gas before proceeding into the conduit 74. A groove 208 can be provided in the conduit 74 for engaging and holding the conical screen 204 to the conduit 74. Other means of attaching the conical screen 204 to the conduit 74 are, of course, possible, and are encompassed by the present invention.

Below the baffle 80, the separator 200 provides a gas trap pipe 210 for removing oil via an oil outlet 212 extending through sidewall 214 of an oil collection area 216. Connections 218, 220 are also provided through the side wall 214 for an oil sight gauge.

It is to be understood that the drip ring 78 and the conical screen 204 can be used together or separately as encompassed by the present invention. The conical screen 204 can be a 40 mesh stainless steel screen.

FIGS. 5 and 6 illustrate a further alternate embodiment of an oil separator 300 having an upper compartment 304 and a lower compartment 306. Gas with entrained oil enters a radial inlet 308 and swirls around a static auger 310 as previously described. Entrained oil is removed by impinging on a surrounding screen surface 312 and collects in an oil collection zone 316 below a perforate baffle 320. The perforate baffle 320 prevents turbulent gas from affecting oil collected in the oil collection zone 316. A gas trap in the form of a stand pipe 322 is arranged in the oil collection zone 316. The stand pipe 322 is connected to an oil outlet 324.

The static auger 310 is coaxially arranged around an oil outlet pipe 330 having an inlet 332 for receiving gas. A drip ring 336 is provided as previously described.

In the upper compartment, a porous replaceable coalescing filter 340 is arranged mounted on a base 342 and held by a threaded rod 344 having a hold down nut 346 covering a portion of a top plate 350. Gas moving through the conduit 330 in an upward direction must pass radially outwardly through the coalescing filter 340 past a deflector baffle 356 and out of a gas outlet 360. Any residual oil in the gas is removed by the coalescing filter 340 and will drip downwardly to collect on an imperforate baffle 366 and when reaching a select level will pass through a secondary oil outlet 370 which can then be piped up to an oil collection location.

The deflection baffle 356 as shown in FIG. 6 is arcuate and forces the gas to take a more tortuous path to the outlet. Sight glass fittings for mounting a sight glass to the separator 300 are provided at 380, 382, 384 and can be used to monitor the oil level in both the upper chamber 304 and the oil collecting zone 316.

As is apparent from the foregoing specification, the invention is susceptible of being embodied with various alternations and modifications which may differ particularly from those that has been described in the preceding specification and description. It should be understood that I wish to embody within the scope of the patent warranted hereon all such modifications as reasonably and properly come within the scope of my contribution to the art.

I claim as my invention:

1. A device for separating oil from a gas comprising:
   a housing having a peripheral wall and a bottom wall;
   an oil/gas inlet into said housing;
   a gas outlet through said housing;
   a cylindrical wall forming a central passage within said housing and having an inlet opening within said housing, said cylindrical wall in flow communication with said gas outlet;
   a helical wall formed within said housing between said peripheral wall and said cylindrical wall;
   an oil collection zone arranged below said helical wall;
   an oil outlet arranged through said housing in said oil collection zone;
   a baffle arranged around said cylindrical wall projecting radially therefrom and located between said helical wall and said inlet opening of said cylindrical wall for directing oil radially outwardly from said cylindrical wall; and
   means for collecting and separating oil from said oil/gas mixture located in a space between said helical wall and said peripheral wall.

2. A device according to claim 1, wherein said baffle comprises an annular disk.

3. A device according to claim 1, wherein said means for collecting and separating oil comprises a mesh screen liner on the interior of said peripheral wall.

4. A device according to claim 1, wherein said baffle comprises a ring closely fitting around said cylindrical wall, said ring having a radially downwardly sloping top surface.

5. A device according to claim 1, further comprising an oil baffle arranged between said gas outlet and said oil collection zone, said oil baffle having an aperture therein for passing oil therethrough.

6. A device according to claim 5, wherein said oil baffle is a conical baffle having a downwardly and inwardly sloping wall spaced below said helical wall, and having an aperture at the apex thereof.

7. A device according to claim 6, wherein said baffle extends across a diameter of said housing and has continuous engagement with said peripheral wall.

8. A device according to claim 1 further comprising a sump arranged in said oil collection zone, said sump having a means for maintaining a preset oil level therein, said means communicating oil through said oil outlet, said sump having oil inlet apertures in a sidewall thereof for entrance of oil from said peripheral wall.

9. A device according to claim 1, wherein said oil/gas inlet is a tubular inlet having an axis which is arranged radially with respect to an axis of said peripheral wall.

10. A device according to claim 1 further comprising a screen covering said opening for said gas outlet.

11. A device according to claim 10, wherein said screen is shaped to define an enclosed volume below said opening of said gas outlet.

12. A device according to claim 1, further comprising a porous filter mounted on an outlet end of said central passage between said gas outlet and said cylindrical wall.

13. A device according to claim 12, wherein said housing comprises a removable top wall and said porous filter is removable through said removable top wall when said top wall is removed, said housing comprising a baffle below said porous filter and a threaded rod extending from said baffle through a central portion of said porous filter with a threaded hold down portion arranged engaged to said threaded rod above said porous filter, said hold down portion removable to remove said porous filter.

14. A device for separating oil from a gas comprising:
a cylindrical housing formed by a peripheral wall having a vertical axis and having closed top and bottom ends;
an oil/gas mixture inlet extending radially to said axis of said peripheral wall through said peripheral wall;
a gas outlet formed by a cylindrical wall extending through said housing and having a lower open end interior of said housing, said cylindrical wall forming a central passage coaxial with said peripheral wall;
a helical wall extending from said cylindrical wall towards said peripheral wall;
an oil collection zone below said cylindrical wall; and
an oil outlet in said oil collection zone; and
means arranged between said helical wall and said lower open end of said cylindrical wall for preventing oil dripping down said cylindrical wall from entering said lower open end of said cylindrical wall.

15. A device according to claim 14, wherein said means for preventing comprises a baffle projecting continuously around said cylindrical wall.

16. A device according to claim 16, wherein said baffle comprises a ring shape sloping downwardly and outwardly.

17. A device for separating oil from a gas comprising:
a vertical axis housing formed by a peripheral wall and having closed top and bottom ends;
an oil/gas mixture inlet provided adjacent to said closed top end;
a gas outlet conduit formed by a cylindrical wall extending through said top end and having a lower open end interior of said housing, said cylindrical wall forming a central passage coaxial with said axis;
a helical wall extending more than a full revolution about said axis, extending from said cylindrical wall towards, but terminating radially inwardly of said peripheral wall, and extending from an area adjacent said top end and terminating above said bottom end;
an oil collection zone; baffle means arranged above said oil collection zone for preventing turbulent gas from influencing oil collected in the oil collection zone;
an oil outlet in said oil collection zone; and
a solid annular drip ring attached to said cylindrical wall, below said helical wall and above said lower open end, and extending radially outwardly therefrom, said drip ring having a continuous conical top surface.

18. A device according to claim 17, including means for collecting and separating oil from said oil/gas mixture located between said helical wall and said peripheral wall.

19. A device according to claim 18 wherein said means for collecting and separating oil comprises a mesh screen liner on the interior of said peripheral wall.

20. A device according to claim 17, wherein said baffle means comprises a partition wall above said oil collection zone having a aperture.

21. A device according to claim 17, wherein baffle means comprises a sump.

22. A device for separating oil from a gas, comprising:
a housing having a peripheral wall and a bottom wall;
an oil/gas inlet into said housing;
a gas outlet formed by a cylindrical wall forming a central passage within said housing and having an opening within said housing;
a helical wall formed within said housing between said peripheral wall and said cylindrical wall;
an oil collection zone arranged below said helical wall;
an oil outlet arranged through said housing in said oil collection zone; and
a screen connected to said cylindrical wall and covering said opening of said gas outlet.

23. A device according to claim 22, wherein said screen is shaped to define an enclosed volume below said opening of said gas outlet.

24. A device according to claim 23, wherein said screen has a conical shape.

25. A device for separating oil from a gas, comprising:
a housing having a peripheral wall and a bottom wall;
an oil/gas inlet into said housing;

a gas outlet through said housing;

a cylindrical wall forming a central passage within said housing and having an inlet opening within said housing, said cylindrical wall in flow communication with said gas outlet;

a helical wall formed within said housing between said peripheral wall and said cylindrical wall;

an oil collection zone arranged below said helical wall;

an oil outlet arranged through said housing in said oil collection zone; and a porous filter arranged between said gas outlet and said cylindrical wall, said porous filter arranged to communicate gas from said cylindrical wall to said gas outlet.

26. A device according to claim 25, wherein said housing comprises a removable top wall arranged axially aligned with said porous filter, removing of said top wall allowing access to said porous filter, and said porous filter is replaceably connected within said housing.

27. A device according to claim 25, wherein said housing further comprises a baffle plate separating said housing into upper and lower compartments, said porous filter arranged in said upper compartment and said helical wall arranged in said lower compartment, said oil/gas inlet arranged communicating into said lower compartment, and said gas outlet arranged through said housing in said upper compartment, and said upper compartment having a second oil outlet arranged above said baffle plate.

* * * * *